US006321086B1

(12) United States Patent
Thurston et al.

(10) Patent No.: US 6,321,086 B1
(45) Date of Patent: Nov. 20, 2001

(54) COMPARATOR AND METHODS FOR VOTING THEREWITH

(75) Inventors: Jeffrey F. Thurston, Lake Zurich; David P. Helm, Carol Stream; Stephen D. VanSickle, Chicago; Elizabeth B. Esker, Cary, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/327,785

(22) Filed: Jun. 7, 1999

(51) Int. Cl.[7] .................................................. H04Q 7/20
(52) U.S. Cl. ........................ 455/433; 455/517; 455/524
(58) Field of Search ................................. 455/422, 507, 455/517, 132, 561, 403, 575, 524; 375/347; 370/479

(56) References Cited

U.S. PATENT DOCUMENTS

| | | | |
|---|---|---|---|
| 4,788,670 | * 11/1988 | Hofmann et al. ..................... | 368/119 |
| 4,967,363 | * 10/1990 | Bonafe ................................. | 364/427 |
| 5,131,007 | * 7/1992 | Brown et al. ......................... | 375/40 |
| 5,305,467 | * 4/1994 | Herndon et al. ..................... | 455/56.1 |
| 5,386,424 | * 1/1995 | Driscoll et al. ....................... | 371/36 |
| 5,521,324 | * 5/1996 | Dannenbert et al. ................. | 84/612 |
| 5,638,486 | * 6/1997 | Wang et al. ......................... | 395/2.45 |
| 5,719,871 | * 2/1998 | Helm et al. .......................... | 370/479 |
| 6,018,647 | * 1/2000 | Fitzgerald ............................ | 455/135 |

* cited by examiner

Primary Examiner—Daniel Hunter
Assistant Examiner—Charles Chow
(74) Attorney, Agent, or Firm—Steven R. Santema

(57) ABSTRACT

A comparator comprising one or more first stage voters (115, 117, 119, 121) operably coupled to a second stage voter (123), and methods of voting with the comparator. The first stage voters receive and vote among a number of instances of a signal (A1–A16, B1–B16), yielding respective first stage voted signals (C1, C2), and the second stage voter operates to receive and vote among the first stage voted signals, yielding a second stage voted signal. In alternative embodiments, the first stage voters independently determine (220) vote conclusion times ($T_A$, $T_B$) that are generally non-coincident, independently determine (420) vote conclusion times ($T_{AB}$, $T_{AB}'$) that are substantially coincident, or one of the first stage voters may determine (320) a common vote conclusion time ($T_{AB}$) which is communicated (325) to the other first stage voters. The respective vote conclusion times determines the time at which time the first stage voted signals are sent to the second stage voter. In another embodiment, the first stage voters receive (500, 540) a plurality of instances of a signal, retrieve characteristic information including, for example, context group information (545) and error status (555) and determine the acceptability of the signals by determining, for example, whether the signals are of the proper context (550) and have a better error status (560) than a predetermined error threshold. Thereafter, the instances of the signal having a positive acceptability criteria may be sent to a second stage voter.

23 Claims, 8 Drawing Sheets

COMPARATOR AND METHODS FOR VOTING THEREWITH

FIELD OF THE INVENTION

This invention relates to communication systems, including but not limited to radio frequency (RF) communication systems.

BACKGROUND OF THE INVENTION

In radio communication systems designed to service a large area, it is often desirable to provide a large number of receivers, each positioned at a different location within the area to be serviced. Generally, the receivers may be base stations, repeaters or other communication units capable of receiving signals. The base stations or repeaters usually have an outbound signal power much greater than the inbound signal power of users' mobile or portable communication units and can enable fringe users to communicate with other users' communication units and/or receivers that otherwise might not be accessible under their own power. Typically, the receivers have overlapping effective reception ranges so that messages transmitted within the area may be picked up by any of several receivers on the same frequency or channel. As an example of such a system, a communication unit transmits via a radio frequency (RF) communication resource a message that is received by a number of remote receivers. Each of the receivers sends its received signal to a comparator, also known as a voter typically by wireline communications. The comparator receives and compares each message from each of the receivers and outputs a message that is comprised of either an entire message from one of the receivers or a composite message comprised of segments of the message received from one or more of the receivers. Each message may be comprised of a plurality of message frames.

Generally, comparators include a fixed number of communication ports for receiving and/or transmitting messages and a processor for executing voting functions. For example, ASTROTAC™ or ASTROTAC 3000™ comparators, available from Motorola, Inc., have sixteen communication ports that may be used to receive up to sixteen messages. Occasionally, the number of receivers in the system might exceed the capacity of an individual comparator chassis to receive messages (e.g., for the ASTROTAC 3000™ comparator, greater than sixteen messages), in which case one or more secondary comparator chassis may be connected to a primary comparator chassis to form an "expanded comparator." Preferably, the expanded comparator operates to vote among the several messages and produce an output message generally as described above.

There are a variety of voting methods that have been devised for use in comparators. In one method, known as a single-stage method, all of the message frames received by the secondary comparators are forwarded to the primary comparator for voting. One of the problems associated with this method is that the number of messages received by the primary comparator may exceed the amount that may be effectively voted, due to processing and/or hardware limitations in the primary comparator and/or communication link. Also known are cascading methods in which messages received at a first comparator are voted to yield a first voted message that is forwarded to a second comparator; messages received at the second comparator (including the first voted message and various "unvoted" messages assigned to the second comparator) are voted to yield a second voted message, and so on until reaching a final-stage comparator that yields a final voted signal. This method has been known to exhibit large voting delays as each consecutive chassis must wait to receive voted message(s) from the previous chassis in addition to its assigned "unvoted" messages.

Accordingly, there is a need for a comparator and voting methods for use in the comparator that produce a voted signal without significant voting delays and without exceeding processing and/or hardware limitations of any particular components of the comparator. The present invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
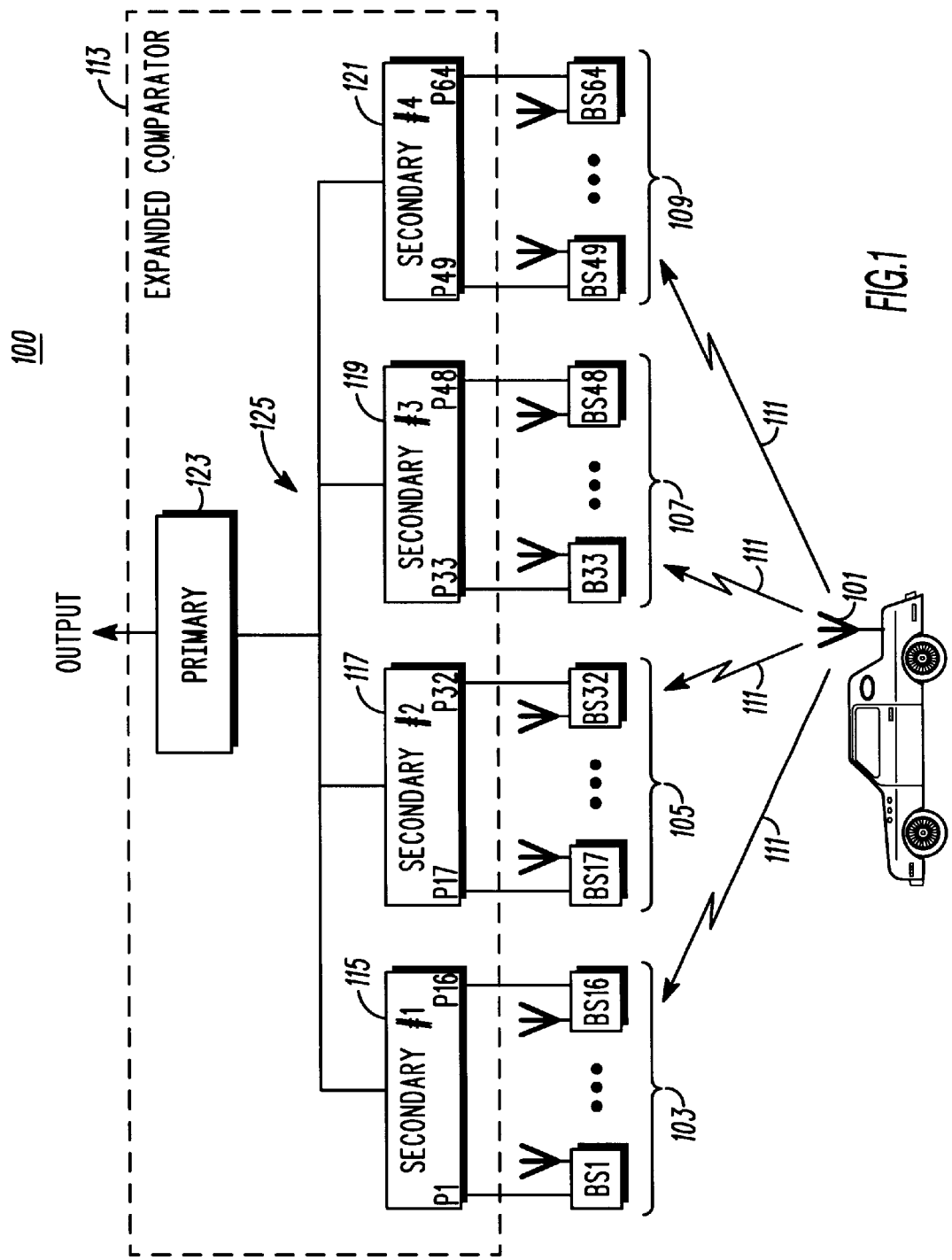
FIG. 1 is a block diagram of a communication system including an expanded comparator in accordance with the present invention.

The comparator in one embodiment comprises a plurality of first stage voters operably coupled to a second stage voter. The first stage voters operate to receive and vote among a number of instances of a signal, yielding respective first stage voted signals, and the second stage voter operates to receive and vote among the first stage voted signals, yielding a second stage voted signal. In one embodiment, the comparator includes a first stage vote conclusion timer for determining a first stage vote conclusion time and a transmitter for sending the first stage voted signals to the second stage voter substantially at the first stage vote conclusion time. In the preferred embodiment, the comparator is an expanded comparator.

One voting method of the present invention comprises the step of receiving M instances of a signal at a comparator comprising N first stage voters and a second stage voter, where M and N are integers. The first stage voters are operable to vote among a plurality of the M instances of the signal, yielding one or more first stage voted signals which are sent to the second stage voter. The second stage voter is operable to vote among the first stage voted signals, yielding a second stage voted signal.

Another voting method of the present invention comprises the step of receiving M instances of a signal at a comparator comprising N first stage voters and a second stage voter, where M and N are integers. The first stage voters are operable to vote among a plurality of the M instances of the signal, yielding one or more first stage voted signals. A first stage vote conclusion time is determined, in one embodiment by a designated one of the first stage voters and communicated to the other first stage voters. The first stage vote conclusion time may be based on time delay information for each of the M instances of the signal at the N first stage voter. The first stage voted signals are sent to the second stage voter that operates to vote among the first stage voted signals and yield a second stage voted signal substantially at the vote conclusion time. An optional step of the method comprises the second stage voter determining a second stage vote conclusion time, substantially at which time the second stage voter yields the second stage voted signal. Another optional step of the method comprises the first stage voters determining respective context groups associated with the M instances of the signal, wherein the voting step comprises voting, by respective ones of the first stage voters, among instances of the signal which are members of a particular context group.

Still another voting method of the present invention comprises the step of receiving M instances of a signal at a comparator comprising N first stage voters and a second stage voter, where M and N are integers. The first stage voters are operable to vote among a plurality of the M instances of the signal, yielding one or more first stage voted signals. First stage vote conclusion times are determined, independently in one embodiment by each of the first stage voters based on time delay information for each of the M instances of the signal at the N first stage voters. The first stage voted signals are sent to the second stage voter that operates to vote among the first stage voted signals and yield a second stage voted signal substantially at the vote conclusion time. An optional step of the method comprises the second stage voter determining a second stage vote conclusion time substantially at which time the second stage voter yields the second stage voted signal. Another optional step of the method comprises the first stage voters determining respective context groups associated with the M instances of the signal, wherein the voting step comprises voting, by respective ones of the first stage voters, among instances of the signal that are members of a particular context group.

Yet another voting method of the present invention comprises a first stage voter performing the step of receiving a plurality of instances of a signal, then retrieving characteristic information from each of the instances of the signal. One or more target characteristics corresponding to the retrieved characteristic information are defined, and then the instances of the signal are evaluated, one at a time, by comparing the retrieved characteristic information with the corresponding target characteristics, yielding respective acceptability criteria. Instances of the signal having a positive acceptability criteria may thereafter be sent to a second stage voter.

Turning now to the drawings and referring initially to FIG. 1, there is shown a communication system 100 in which a first communication unit 101 transmits, via a radio frequency (RF) communication resource, a message 111 that is received by a number of remote receiver groups each including a plurality of base stations, satellite receivers, or repeaters. In the illustrated embodiment, there are four receiver groups 103, 105, 107, 109 each having sixteen base stations, thus the message is receivable by up to sixty-four base stations BS1–BS64. Specifically, receiver group 103 includes base stations BS1–BS16, receiver group 105 includes base stations BS17–BS32, receiver group 107 includes base stations BS33–BS48 and receiver group 109 includes base stations BS49–BS64. It will be appreciated, however, that the communication system may consist of virtually any number M of base stations, satellite receivers or repeaters receiving M corresponding instances of the signal 111. Likewise, the M base stations, satellite receivers or repeater may be allocated among virtually any number N of receiver groups. The number of base stations allocated to particular receiver groups may be varied as needed or desired by the system designer and/or operator.

In one embodiment, each of the M base stations BS1–BS64 sends its received signal to a comparator or voter 113, typically by wireline communications. In a preferred embodiment, the comparator 113 comprises an "expanded comparator" comprising a plurality of first stage comparator chassis 115, 117, 119, 121, interconnected to a second stage comparator chassis 123. The first and second stage comparator chassis may comprise, for example, ASTROTAC 3000™ comparators, available from Motorola, Inc. and interconnected by an isolated Ethernet link 125. The first- and second-stage comparator chassis are designated in FIG. 1 as "secondary" and "primary," respectively. Alternatively, the first- and/or second-stage comparators may comprise individual cards or groups of cards, rather than entire chassis, in which case the cards may or may not be housed within a common chassis.

In the embodiment of FIG. 1, there are four first-stage comparator chassis 115, 117, 119, 121 each corresponding to one of the four receiver groups 103, 105, 107, 109. The first-stage comparator chassis 115, 117, 119, 121 include communication ports P1–P64 (sixteen per chassis) eligible in combination to receive the M instances (e.g., up to 64 instances) of the signal from the base stations BS1–BS64. It will be appreciated, however, that alternative embodiments may use fewer or greater numbers of receiver groups, first-stage comparator chassis and/or fewer or greater numbers of communication ports allocated per chassis. Each comparator chassis 115–123 also has a processor (not shown) for executing various voting functions and a memory (not shown) for storing programs and data relevant to voting functions.

The first stage comparator chassis 115, 117, 119, 121 are eligible to receive a number of messages corresponding to the number of stations in their respective receiver groups 103, 105, 107, 109. For example, in the embodiment of FIG. 1, chassis 115 is eligible to receive up to 16 messages from base stations BS1–BS16, chassis 117 is eligible to receive up to 16 messages from base stations BS17–BS32, chassis 119 is eligible to receive up to 16 messages from base stations BS33–BS48 and chassis 121 is eligible to receive up to 16 messages from base stations BS49–BS64. Nevertheless, it will be appreciated that the respective comparator chassis 115, 117, 119, 121 might receive fewer than 16 messages, or even zero messages from their associated base stations. Each of the comparator chassis 115, 117, 119, 121 outputs zero or more first-stage voted messages that are comprised of either entire messages from receiver(s) in their associated receiver groups or composite messages comprised of portions of the messages received from receivers in their associated receiver group.

Generally, according to principles of the present invention it is desirable for the number of first-stage voted messages to be substantially less than the total number of messages received from the respective receiver groups. Nevertheless, the particular number of messages produced will depend on the number of comparator chassis, the number of messages received by the respective comparator chassis and the particular voting method(s) employed by the respective comparator chassis. For example, in the system of FIG. 1 with four first-stage comparator chassis 115, 117, 119, 121 each receiving up to 16 messages, there are up to 64 messages that may be received. It is desirable for the respective first-stage comparator chassis 115, 117, 119, 121 to use voting methods, such as those hereinafter to be described, that will produce substantially less than 64 voted signals. In one embodiment, the first-stage comparator chassis 115, 117, 119, 121 each produce a single voted signal. Alternatively, the first-stage comparators 115, 117, 119, 121 may send multiple signals but otherwise "filter" their received signals to limit the number of signals forwarded to the second-stage comparator. Each of these embodiments will be described in detail in relation to FIGS. 2 through 8.

In one embodiment, the respective first-stage comparators 115, 117, 119, 121 are connected to the second-stage comparator chassis 123 by an isolated Ethernet link 125. The first-stage comparators 115, 117, 119, 121 send, via the Ethernet link 125, their respective first-stage voted signals to the second-stage comparator 123 that votes among the first-stage voted signals to produce a second-stage voted signal. The second-stage voted signal may be comprised of either an entire voted signal (message) from one of the first-stage voters 115, 117, 119, 121 or a composite signal (message) comprised of portions of the first-stage voted signals received from one or more of the first-stage voters 115, 117, 119, 121. The output of the second-stage comparator chassis (that defines the output of the comparator 113) may be sent to a base station or repeater such as a QUANTAR™ base station, available from Motorola, Inc., that retransmits the message, as is known in the art.

Now turning to FIGS. 2 through 8, there will be described various voting methods according to the present invention, each of which is implementable in the system of FIG. 1 as a software routine, stored in the memories and executed by the processors of the respective comparator chassis 115, 117, 119, 121 and/or 123 of the comparator 113. For convenience, the methods will be described with reference to a system including two first-stage voters (i.e., "Voter A" and "Voter B") and one second-stage voter (i.e., "Voter C"). The signals received by the particular voters will be designated by an alphanumeric notation depending on the order received. For example, "A1" indicates the first signal received by Voter A and "B1" indicates the first signal received by voter B. Generally, the methods of FIGS. 2 through 8 may be implemented with N first-stage voters that receive in combination up to M instances of a signal, where M and N are integers.

Figure 2:
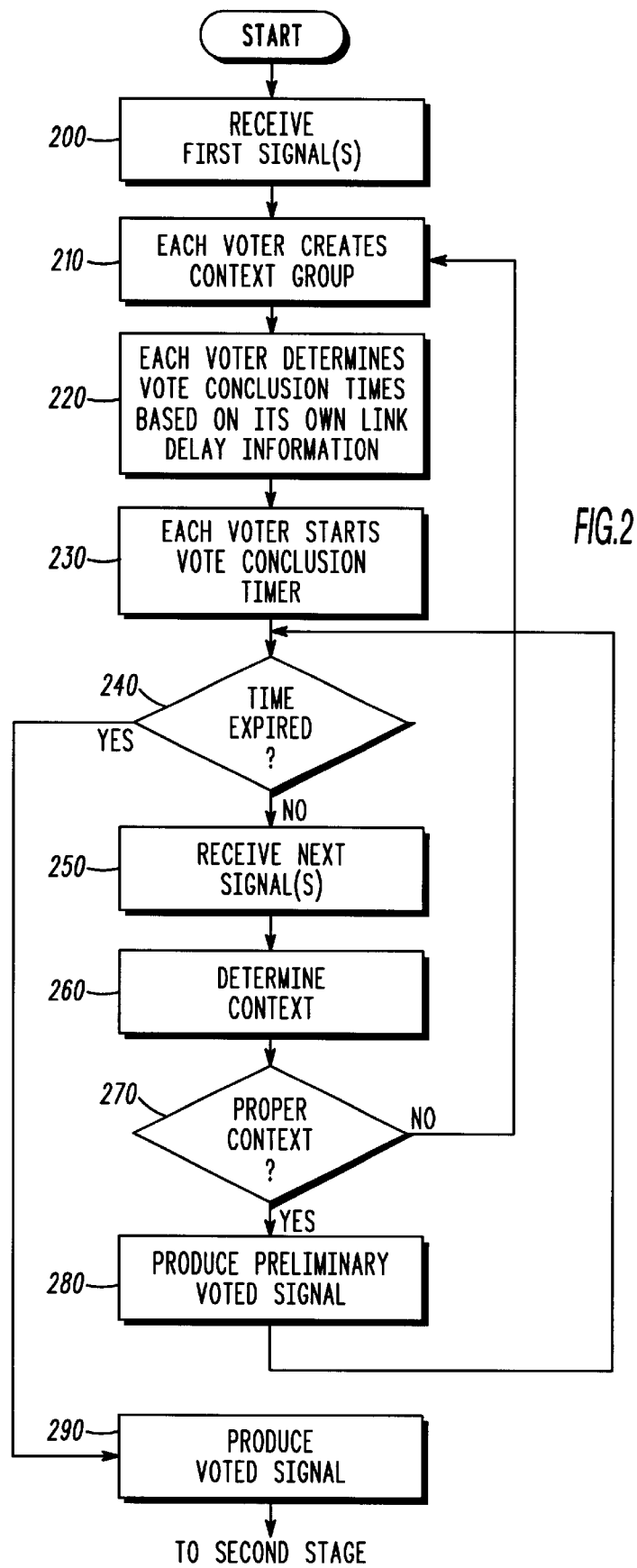
FIG. 2 is a flowchart showing a first voting method in accordance with the present invention.
Figure 3:
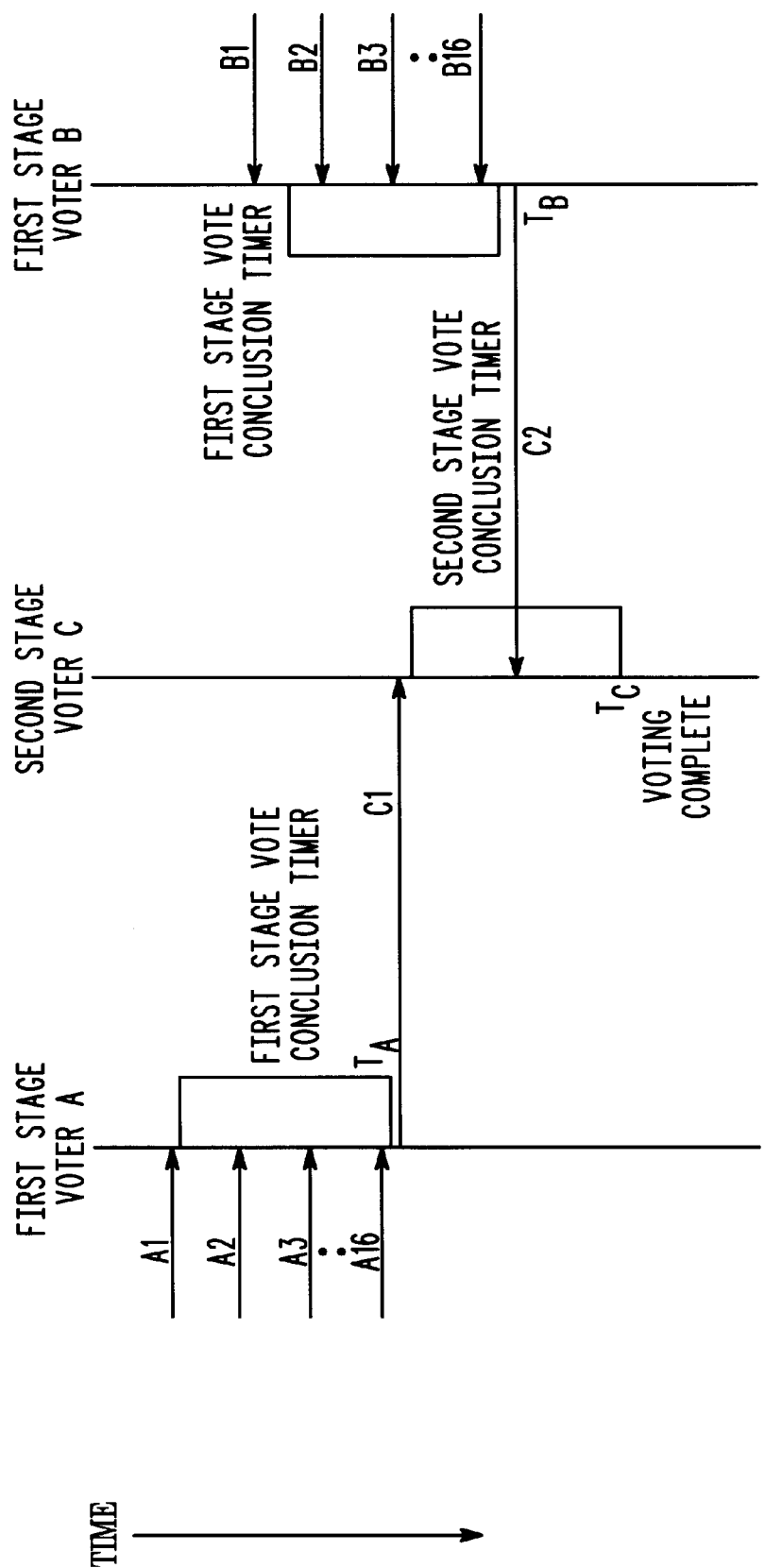
FIG. 3 is a timing diagram associated with the voting method of FIG. 2.

FIG. 2 is a flowchart showing steps that may be performed to implement a voting method according to one embodiment of the present invention. FIG. 3 is a timing diagram illustrating the effect of implementing the steps of FIG. 2.

At step 200, the process begins when the first-stage comparators ("Voter A" and "Voter B") receive first instances of a particular signal (hereinafter "first signal") from their respective signal groups. Generally, the first-stage comparators may be expected to receive their first signal (as well as subsequent signals) at different times due to different link delays between the respective chassis and their associated receivers. Thus, for example, in the timing diagram of FIG. 3, Voter A receives its first signal ("A1") before Voter B receives its first signal ("B1").

At step 210, the first-stage comparators independently create context groups distinguishing the various signals which are to be received and voted. The context groups in one embodiment identify a collection of ports that are receiving signals from a particular subscriber, the ports being determined based upon subscriber ID information imbedded in the signals. Thus, for example, Voter A creates a context group associated with its first received signal "A1" indicating that other instances of the signal "A2, etc." from the same subscriber are to be received and voted. Similarly, Voter B creates a context group associated with its first received signal "B1" indicating that signals of that context group are to be received and voted. At step 220, the first-stage comparators independently determine vote conclusion times that represent the time the first-stage comparators must wait to receive all of the signals present in their respective signal groups (if present). In one embodiment, the vote conclusion times are determined by the first-stage comparators based on information of signals eligible to be received from their particular receiver groups. Thus, for example, Voter A determines a vote conclusion time $T_A$ based on link delay information associated with its receiver group "A" (e.g., signals A1 through A16) and Voter B determines a vote conclusion time $T_B$ based on link delay information associated with its receiver group "B" (e.g., signals B1 through B16). Generally, the vote conclusion times determined by the respective comparators may be expected to differ due to different link delays between the respective chassis and their associated receivers. Thus, for example, in the timing diagram of FIG. 3, vote conclusion time $T_A$ occurs before vote conclusion time $T_B$.

The vote conclusion times are implemented in one embodiment by vote conclusion timers that are started independently (step 230), at the time the first-stage voters receive their first signal. Thus, for example, Voter A starts its timer after receiving signal A1, which timer will expire at vote conclusion time $T_A$ and Voter B starts its timer after receiving signal B1, which timer will expire at vote conclusion time $T_B$. The time "windows" associated with the timers and, as noted above, the vote conclusion times themselves will generally differ according to the link delays associated with the respective voters. Those skilled in the art will appreciate that a number of alternative timing schemes may be used to determine the vote conclusion times $T_A$ and $T_B$. For example, the time windows may be implemented by count-up timers or count-down timers. Moreover, the vote conclusion times $T_A$ and $T_B$ can representing absolute clock times rather than the expiration of a timer.

At step 240, if the vote conclusion time has passed (e.g., if the vote conclusion timers have expired), the voter(s) in one embodiment each produce a single voted signal (step 290) that is sent to the second stage voter. In FIG. 3, for example, "C1" indicates the first voted signal sent to the second-stage voter ("Voter C"), which was produced by Voter A. Similarly, "C2" indicates the second voted signal sent to voter C, which was produced by Voter B.

At step 240, if their voting time is not expired, the first-stage voters continue to receive subsequent signals (step 250) and determine, one at a time, the context group of those signals (step 260). For each consecutive signal having a context group that properly matches the context group of the previous signals (step 270), the voters produce a preliminary voted signal (step 280) that generally represents the "best" signal of that particular context group yet received or constructed from previous signals. The preliminary voted signal is stored in memory and updated, as appropriate when even "better" signals are encountered within the particular context group. Finally, at step 290, if voting time has expired, the most recent preliminary voted signal of that context group (now defining the first-stage voted signal) is sent to the second-stage voter.

For example, consider the signals received by Voter A. Having received a first signal "A1" (step 200), creating a context group associated with signal A1 (step 210) and determining a vote conclusion time $T_A$ (step 220), assume that Voter A receives fifteen additional signals in the same context group before voting time has expired. The second signal A2 is "voted," or compared against the first signal A1, to produce a first preliminary voted signal which for example may comprise signal A1; the third signal A3 is similarly voted against the first preliminary voted signal ("A1") to produce a second preliminary voted signal, which for example may comprise signal A3, and so forth until the vote conclusion timer expires. The preliminary voted signal at the expiration of the vote conclusion timer, which may for example, may comprise signal A9, defines the first-stage voted signal that is sent to the second stage voter.

If at step 270 a received signal does not properly match the context group of a previous signal, the voter returns to step 210 to create a new context group. The process continues for signals of the new context group until ultimately, a first-stage voted signal of the new context group is sent to the second-stage voter in the same manner heretofore described.

In one embodiment, the second-stage comparator ("Voter C") performs generally the same steps identified in the flowchart of FIG. 2, except the second-stage comparator operates upon the first-stage voted signals (e.g., C1, C2) rather than the originally received signals (c.g., A1–A16 or B1–B16). For convenience, the same step numbers will be used whether implemented by the first-stage or second-stage comparators.

At step 200, the second-stage comparator ("Voter C") receives a first one of the first-stage voted signals (e.g., signal "C1"). Generally, in this embodiment, the first-stage voted signals may be expected to be received at different times because the different vote conclusion times $T_A$ and $T_B$ are computed independently by the first-stage voters "A" and "B." Hence, FIG. 3 shows signal "C2" being received substantially later than signal "C1."

At step 210, a context group is created by the second stage comparator ("Voter C") identifying characteristics of the first-stage voted signals that are to be received and voted. Then, at step 220, the second-stage comparator ("Voter C") determines a vote conclusion time that represents a time Voter C must wait to vote, allowing adequate time for all of the first-stage voted signals to have been received. In one embodiment, Voter C determines its vote conclusion time independently based on link delay information of first-stage voted signals eligible to be received from the first stage voters. Thus, for example, Voter C determines a vote conclusion time $T_C$ based on link delay information associated with first-stage voters "A" and "B."

The vote conclusion time is implemented in one embodiment by a vote conclusion timer that is started at step 230, at the time the first one of the first-stage voted signals is received. Thus, for example, Voter C starts its timer after receiving signal C1, which timer will expire at vote conclusion time $T_C$. Similar to the first stage vote conclusion times $T_A$ and $T_B$, it will be appreciated that a number of alternative timing schemes may be used to determine the vote conclusion time $T_C$. For example, the time windows may be implemented by count-up timers or count-down timers. Moreover, the vote conclusion time $T_C$ can represent an absolute clock time rather than the expiration of a timer.

At step 240 the second-stage voter ("Voter C") determines whether its vote conclusion timer has expired. If the voting time has expired, Voter C in one embodiment produces a single voted signal (step 290), defining a second-stage voted signal that may be output to a base station or repeater. If the voting time has not expired, Voter C continues to receive subsequent first-stage voted signals (step 250) and determines, one at a time, the context group of those signals (step 260). For each consecutive first-stage voted signal having a context group that properly matches the context group of the previous first-stage voted signal(s) (step 270), Voter C produces a preliminary voted signal (step 280) that generally represents the "best" first-stage voted signal of that particular context group yet received or constructed from previous signals. The preliminary voted signal is stored in memory and updated, as appropriate when even "better" first-stage voted signals are encountered within the particular context group. Finally, at step 290, if voting time has expired, the most recent preliminary voted signal of that context group (now defining the second-stage voted signal) is output to a base station or repeater, as is known in the art.

If at step 270 a received first-stage voted signal does not properly match the context group of a previous first-stage voted signal, the second-stage voter returns to step 210 to create a new context group. The process continues for first-stage voted signals of the new context group until ultimately, a second-stage voted signal of the new context group is output in the same manner heretofore described.

Figure 4:
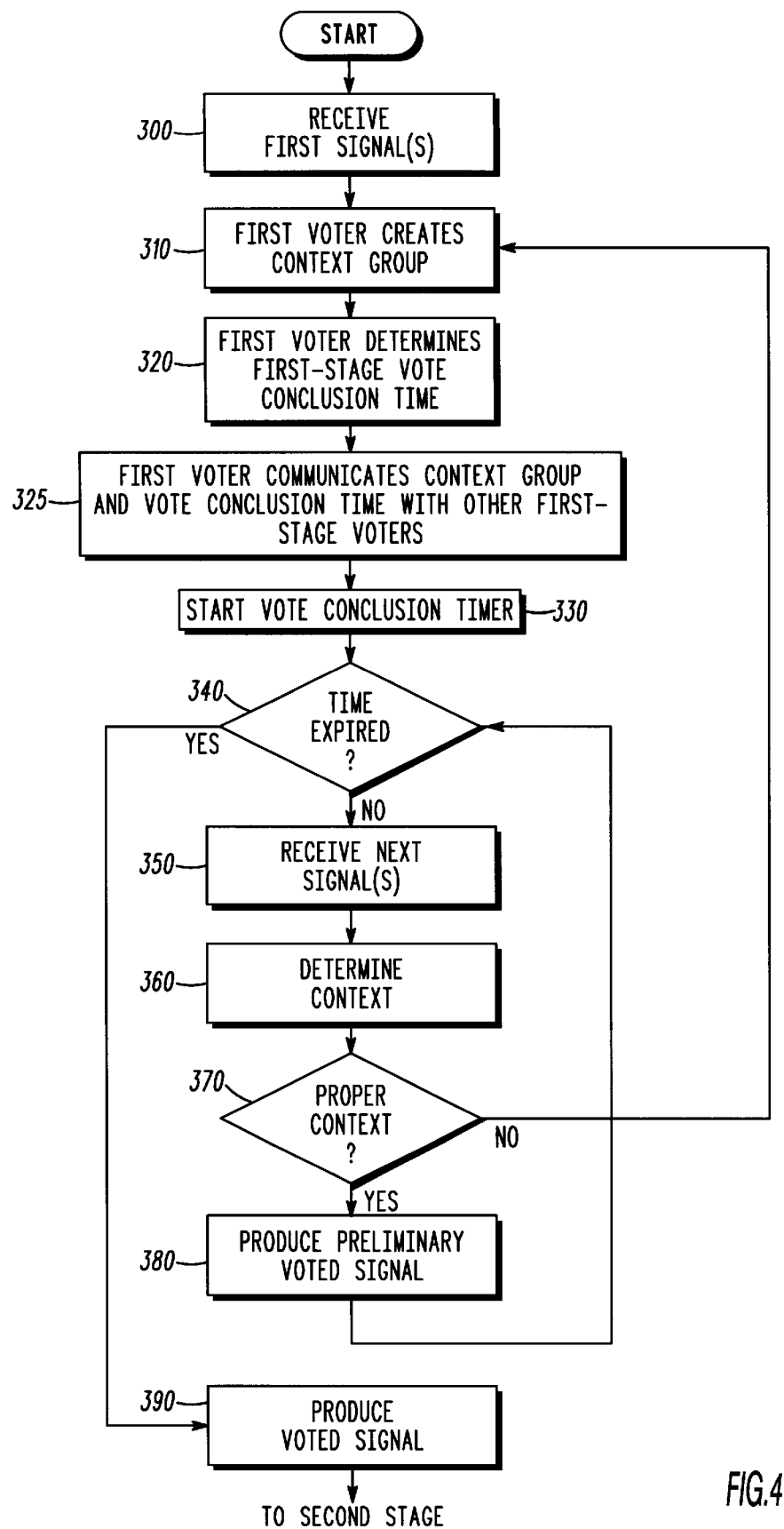
FIG. 4 is a flowchart showing a second voting method in accordance with the present invention.
Figure 5:
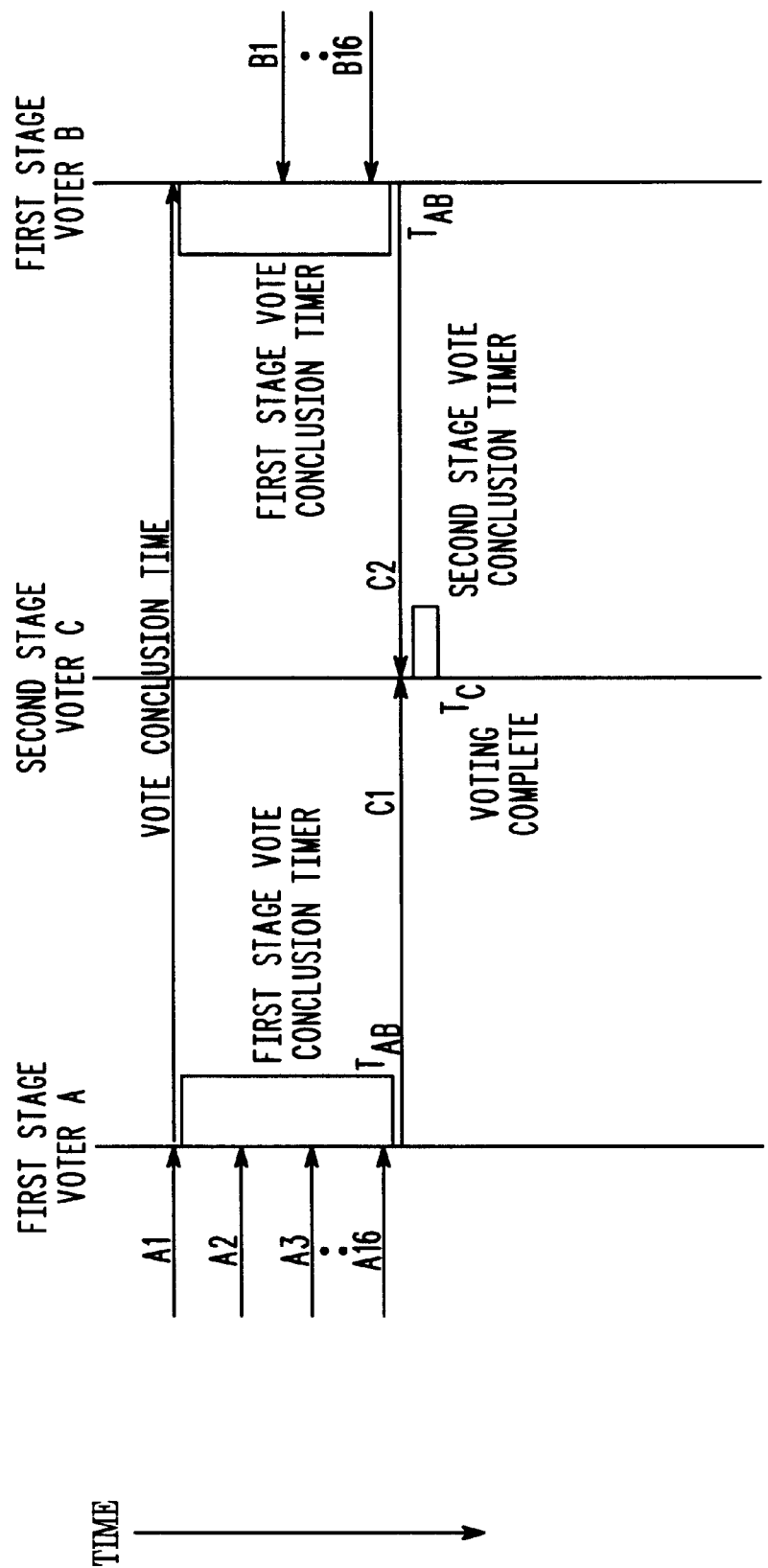
FIG. 5 is a timing diagram associated with the voting method of FIG. 4.

FIG. 4 is a flowchart showing steps that may be performed to implement a voting method according to another embodiment of the present invention. FIG. 5 is a timing diagram illustrating the effect of implementing the steps of FIG. 4.

At step 300, the process begins when the first-stage comparators ("Voter A" and "Voter B") receive the first instances of a particular signal (hereinafter "first signal") from their respective signal groups. Like the embodiments of FIGS. 2 and 3, the first-stage comparators may be expected to receive their first signal (as well as subsequent signals) at different times due to different link delays between the respective chassis and their associated receivers. Thus, for example, in the timing diagram of FIG. 5, Voter A receives its first signal ("A1") before Voter B receives its first signal ("B1").

At step 310, the first one of the first-stage comparators to receive a signal (e.g., Voter A in the timing diagram of FIG. 5) creates a context group identifying characteristics of the signals that are to be received and voted. The context groups in one embodiment identify a collection of ports that are receiving signals from a particular subscriber, the ports being determined based upon subscriber ID information imbedded in the signals. Thus, for example, Voter A creates a context group associated with its first received signal "A1" indicating that other instances of the signal "A2, etc." from the same subscriber are to be received and voted. At step 325, the context group determined by the first one of the first-stage comparators (e.g., Voter A) is communicated to the other first-stage voters (e.g., Voter B), thus step 310 need only be performed by the first one of the first-stage voter(s).

Next, at step 320, the first one of the first-stage comparators to receive a signal (e.g., Voter A in the timing diagram of FIG. 5) determines a vote conclusion time that is communicated to the other first-stage comparators (e.g., Voter B) at step 325. Thus, step 320 need only be performed by the first one of the first-stage voters. The vote conclusion time in one embodiment is determined by the first one of the first-stage comparators based on link delay information of signals eligible to be received from all receiver groups. Thus for example, Voter A determines a vote conclusion time $T_{AB}$ based on link delay information associated with not only its own receiver group "A" (e.g., signals A1–A16) but also based on link delay information associated with receiver group "B" (e.g., signals B1–16).

Because the vote conclusion time $T_{AB}$ is shared by both Voter A and Voter B, both Voter A and Voter B may be expected to conclude voting at substantially the same time $T_{AB}$. Moreover, because the vote conclusion time $T_{AB}$ is based on link delay information from all ports, it is expected that each voter will have adequate time to receive signals from all of its associated receivers.

The vote conclusion times are implemented in one embodiment by synchronizing each of the first stage voters with a common clock and then starting a vote conclusion timer (step 330) at the time the first one of the first-stage voters receives its first signal. Thus, for example, Voter A and Voter B both start their timers after Voter A receives signal A1, which timers will both expire at time $T_{AB}$. Thus, the time "windows" associated with Voter A and Voter B are generally identical and will start and expire at substantially the same time. Those skilled in the art will appreciate that a number of alternative timing schemes may be used to determine the vote conclusion time $T_{AB}$. For example, the time window may be implemented by count-up timers or count-down timers. Moreover, the vote conclusion time $T_{AB}$ can represent an absolute clock time rather than the expiration of a timer.

At step 340, the first-stage voters determine whether their vote conclusion timers have expired. If their voting time has expired, the voter(s) in one embodiment each produce a single voted signal (step 390) that is sent to the second stage voter. In FIG. 5, for example, "C1" indicates the first voted signal sent to the second-stage voter ("Voter C"), which was produced by Voter A. Similarly, "C2" indicates the second voted signal sent to voter C, which was produced by Voter B. Because Voter A and Voter B share a common vote conclusion time, signals C1 and C2 are received at substantially the same time by the second stage voter C.

At step 340, if their voting time is not expired, the first-stage voters continue to receive subsequent signals (step 350), determine the context of those signals (step 360) and, if the signals are of the proper context (step 370), produce preliminary voted signals (step 380) in generally the same fashion described in relation to 1FIG. 2. If at step 370 a received signal does not properly match the context group of a previous signal, the voter returns to step 310 to create a new context group, and the process continues generally in the same manner described in relation to FIG. 2.

In one embodiment, the second-stage comparator ("Voter C") performs generally the same steps identified in the flowchart of FIG. 4, except the second-stage comparator operates upon voted signals and receives all of the first-stage voted signals (e.g., signal "C1" and "C2") at substantially the same time. For convenience, the same step numbers will be used whether implemented by the first-stage or second-stage comparators.

At step 300, the second-stage voter receives all of its signals (e.g., "C1" and "C2") at substantially the same time $T_{AB}$. At step 310 the second stage voter ("Voter C") creates a context group identifying characteristics of the first-stage voted signals that are to be received and voted. Next, at step 320, the second-stage voter ("Voter C") determines a vote conclusion time that represents a time it must wait to receive all of the first-stage voted signals. Because all of the first-stage voted signals are received at substantially the same time, the second-stage voter may use a relatively small voting window such as, for example, a fixed time window of about 20 milliseconds.

The vote conclusion time is implemented in one embodiment by a vote conclusion timer that is started at step 330, at the time the first one of the first-stage voted signals is received. Thus, for example, Voter C starts its timer after receiving signal C1 or C2, which timer will expire at vote conclusion time $T_C$. Similar to the first stage vote conclusion time $T_{AB}$, it will be appreciated that a number of alternative timing schemes may be used to determine the vote conclusion time $T_C$. For example, the time windows may be implemented by count-up timers or count-down timers. Moreover, the vote conclusion time $T_C$ can represent an absolute clock time rather than the expiration of a timer.

At step 340, the second-stage voter ("Voter C") determines whether its vote conclusion timer has expired. If the voting time has expired, Voter C in one embodiment produces a single voted signal (step 390), defining a second-stage voted signal that may be output to a base station or repeater. At step 340, if the voting time has not expired, the second-stage voter continues to receive subsequent signals (step 350), determine the context of those signals (step 360) and, if the signals are of the proper context (step 370), produce preliminary voted signals (step 380) in generally the same fashion described in relation to FIG. 2. If at step 370 a received signal does not properly match the context group of a previous signal, the voter returns to step 310 to create a new context group, and the process continues generally in the same manner described in relation to FIG. 2.

Figure 6:
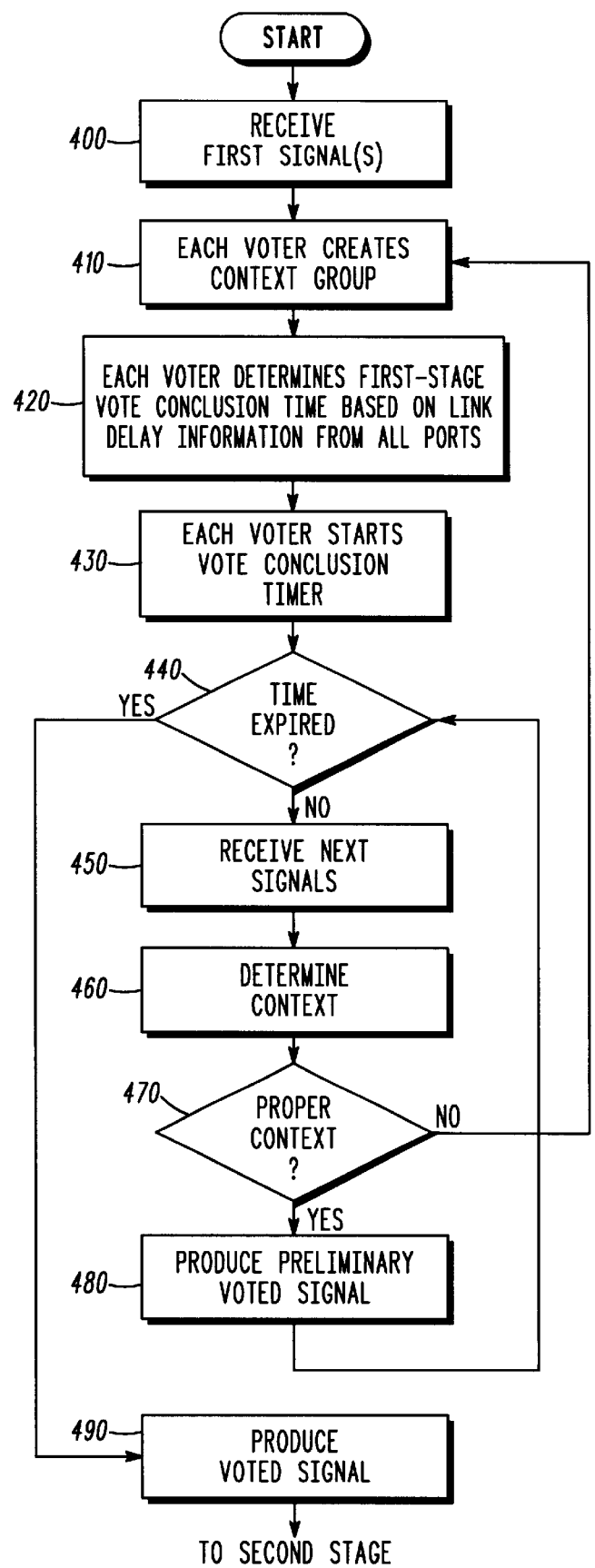
FIG. 6 is a flowchart showing a third voting method in accordance with the present invention.
Figure 7:
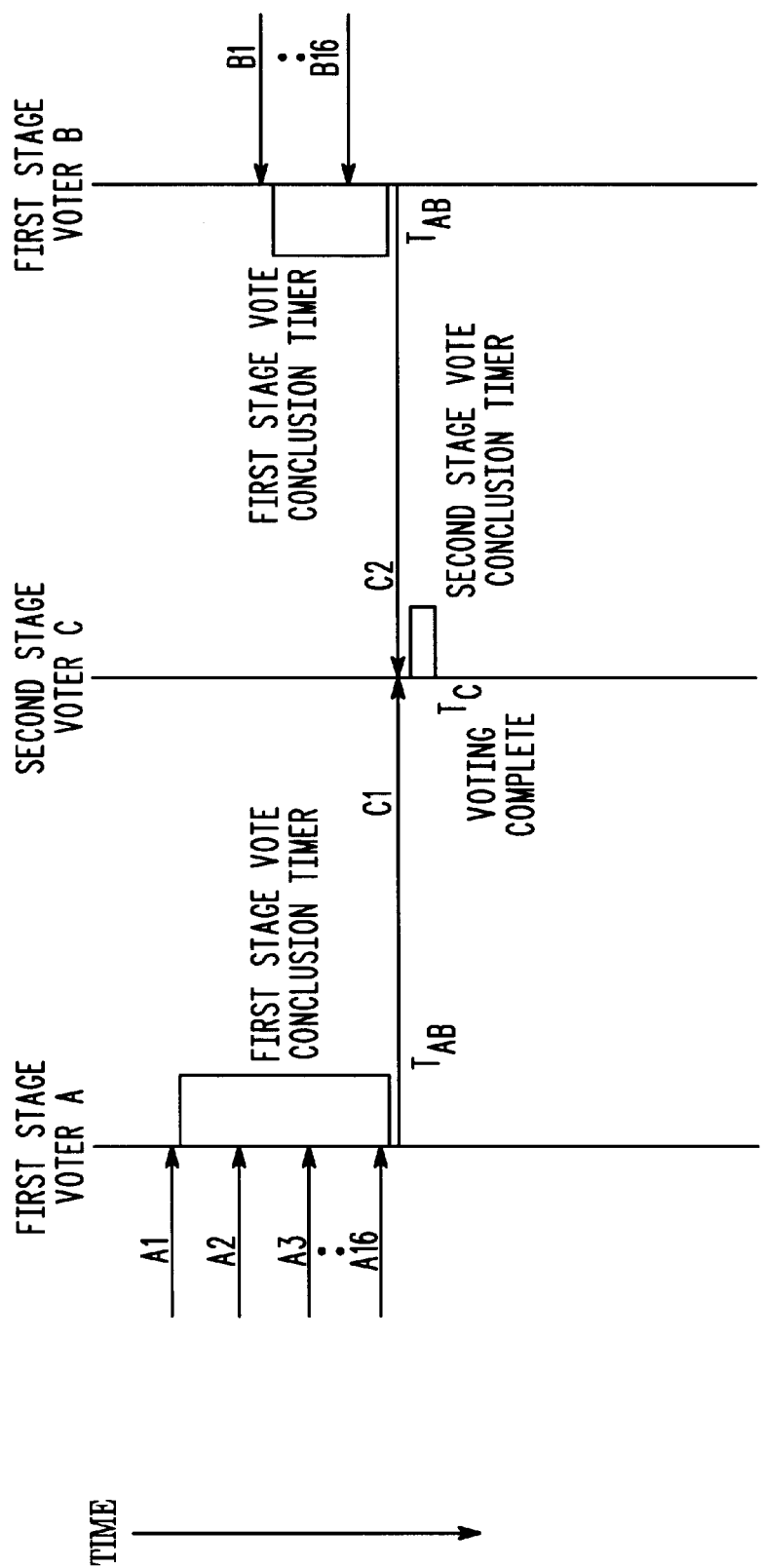
FIG. 7 is a timing diagram associated with the voting method of FIG. 6.

FIG. 6 is a flowchart showing steps that may be performed to implement a voting method according to another embodiment of the present invention. FIG. 7 is a timing diagram illustrating the effect of implementing the steps of FIG. 6.

At step 400, the process begins when the first-stage comparators ("Voter A" and "Voter B") receive the first instances of a particular signal (hereinafter "first signal") from their respective signal groups. Like the embodiments of FIGS. 2 through 5, the first-stage comparators may be expected to receive their first signal (as well as subsequent signals) at different times due to different link delays between the respective chassis and their associated receivers. Thus, for example, in the timing diagram of FIG. 7, Voter A receives its first signal ("A1") before Voter B receives its first signal ("B1").

At step 410, each first-stage comparator receiving a signal at step 400 independently creates a context group identifying characteristics of the signals that are to be received and voted. For example, in one embodiment, Voter A creates a context group associated with its first received signal "A1" indicating that signals of that context group are to be received and voted. Similarly, Voter B creates a context group associated with its first received signal "B1" indicating that signals of that context group are to be received and voted. At step 420, the first-stage comparators determine vote conclusion times that represent the time the first-stage comparators must wait to receive all of the signals present in their respective signal groups (if present). The vote conclusion times in one embodiment are determined independently by each of the first-stage comparators based on link delay information of signals eligible to be received from all receiver groups. Thus, for example, Voter A determines a vote conclusion time $T_{AB}$ based on link delay information associated with not only its own receiver group "A" (e.g., signals A1–A16) but also based on link delay information associated with receiver group "B" (e.g., signals B1–16). Voter B similarly determines a vote conclusion time $T_{AB}'$ based on link delay information associated with not only its own receiver group "B" (e.g., signals B1–B16) but also based on link delay information associated with receiver group "A" (e.g., signals B1–16).

Although the vote conclusion times $T_{AB}$ and $T_{AB}'$ are determined independently by both Voter A and Voter B, they are substantially coincident in time because they are both based on link delay information from all ports. Thus, Voter A and Voter B may be expected to conclude voting at substantially the same time. Moreover, because the vote conclusion times $T_{AB}$ and $T_{AB}'$ are based on link delay information from all ports, each voter will have adequate time to receive signals from all of its associated receivers.

The vote conclusion times are implemented in one embodiment by vote conclusion timers that are started independently (step 430) at the time the first-stage voters receive their first signal. Thus, the first stage voters need not be synchronized with to a common clock. For example, Voter A starts its timer after receiving signal A1, which timer will expire at vote conclusion time $T_{AB}$ and Voter B starts its timer after receiving signal B1, which timer will expire at vote conclusion time $T_{AB}'$. The time "windows" associated with the timers will generally differ according to the link delays associated with the respective voters but, as noted above, will expire at substantially the same time. Those skilled in the art will appreciate that a number of alternative timing schemes may be used to determine the vote conclusion times $T_{AB}$ and $T_{AB}'$. For example, the time windows may be implemented by count-up timers or count-down timers. Moreover, the vote conclusion times $T_{AB}$ and $T_{AB}'$ can represent absolute clock times rather than the expiration of a timer.

At step 440, the first-stage voters determine whether their vote conclusion timers have expired. If their voting time has expired, the voter(s) in one embodiment each produce a single voted signal (step 490) that is sent to the second stage voter. In FIG. 7, for example, "C1" indicates the first voted signal sent to the second-stage voter ("Voter C") at time $T_{AB}$, which was produced by Voter A. Similarly, "C2" indicates the second voted signal sent to voter C at time $T_{AB}'$, which was produced by Voter B. Because $T_{AB}$ and $T_{AB}'$ are substantially coincident in time, signals C1 and C2 are received at substantially the same time by the second stage voter C.

At step 440, if their voting time is not expired, the first-stage voters continue to receive subsequent signals (step 450), determine the context of those signals (step 460) and, if the signals are of the proper context (step 470), produce preliminary voted signals (step 480) in generally the same fashion described in relation to FIGS. 2 and 4. If at step 470 a received signal does not properly match the context group of a previous signal, the voter returns to step 410 to create a new context group and the process continues generally in the same manner described in relation to FIGS. 2 and 4.

In one embodiment, the second-stage comparator ("Voter C") performs generally the same steps identified in the flowchart of FIG. 6, except the second-stage comparator operates upon voted signals and receives all of the first-stage voted signals (e.g., signal "C1" and "C2") at substantially the same time. For convenience, the same step numbers will be used whether implemented by the first-stage or second-stage comparators.

At step 400, the second-stage voter receives its signals (e.g., "C1" and "C2") at substantially coincident times $T_{AB}$ and $T_{AB}'$. At step 410 the second stage voter ("Voter C") creates a context group identifying characteristics of the first-stage voted signals that are to be received and voted. Next, at step 420, the second-stage voter ("Voter C") determines a vote conclusion time that represents a time it must wait to receive all of the first-stage voted signals. Because all of the first-stage voted signals are received at substantially the same time, the second-stage voter may use a relatively small voting window such as, for example, a fixed time window of about 20 milliseconds.

The vote conclusion time is implemented in one embodiment by a vote conclusion timer that is started at step 430, at the time the first one of the first-stage voted signals is received. Thus, for example, Voter C starts its timer after receiving signal C1 or C2, which timer will expire at vote conclusion time $T_C$. Similar to the first stage vote conclusion times $T_{AB}$ and $T_{AB}'$, it will be appreciated that a number of alternative timing schemes may be used to determine the vote conclusion time $T_C$. For example, the time windows may be implemented by count-up timers or count-down timers. Moreover, the vote conclusion time $T_C$ can represent an absolute clock time rather than the expiration of a timer.

At step 440, the second-stage voter ("Voter C") determines whether its vote conclusion timer has expired. If the voting time has expired, Voter C in one embodiment produces a single voted signal (step 490), defining a second-stage voted signal that may be output to a base station or repeater. At step 440, if the voting time has not expired, the second-stage voter continues to receive subsequent signals (step 450), determine the context of those signals (step 460) and, if the signals are of the proper context (step 470), produce preliminary voted signals (step 480) in generally the same fashion described in relation to FIGS. 2 and 4. If at step 470 a received signal does not properly match the context group of a previous signal, the voter returns to step 410 to create a new context group and the process continues generally in the same manner described in relation to FIGS. 2 and 4.

Figure 8:
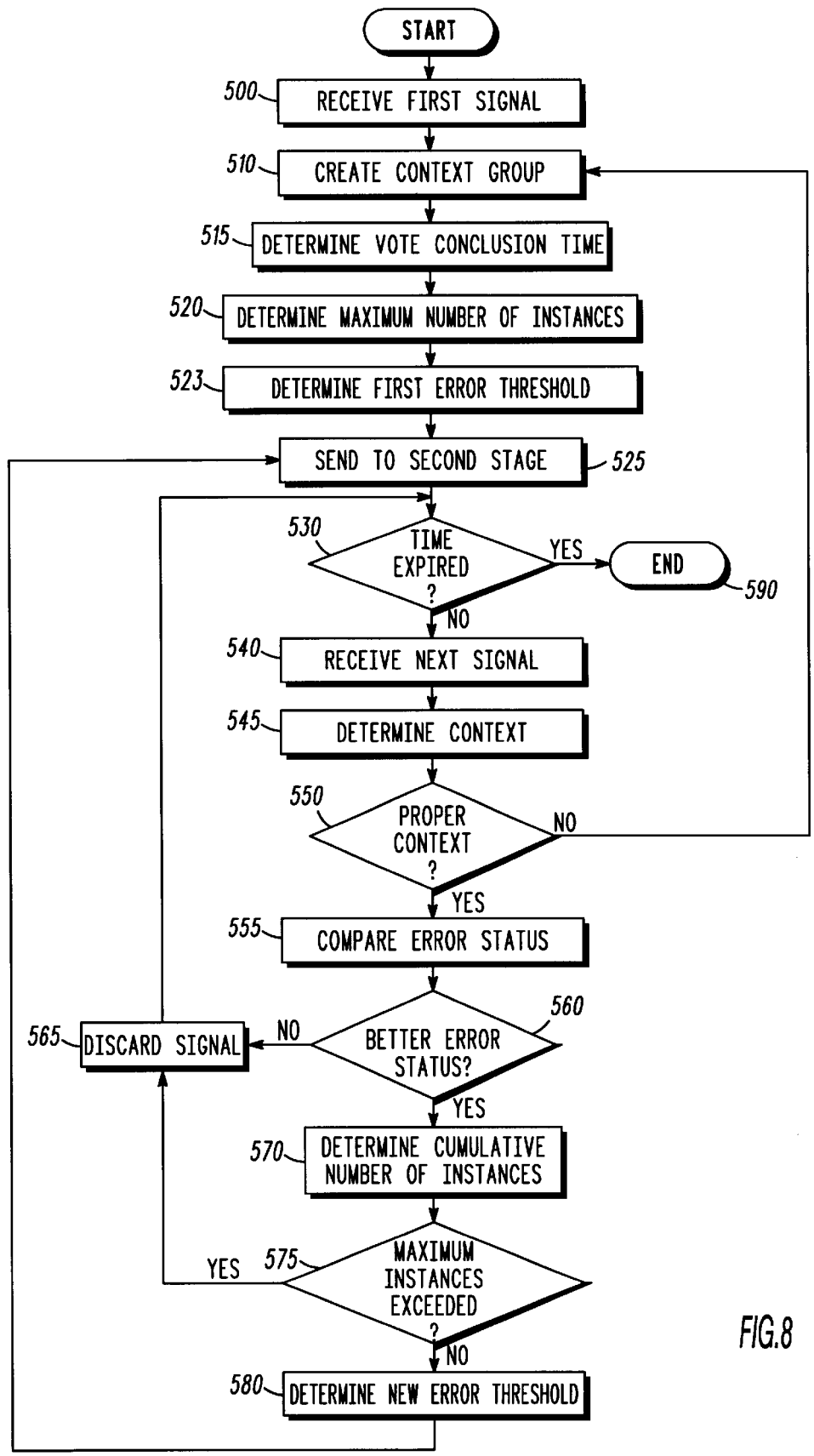
FIG. 8 is a flowchart showing a fourth voting method in accordance with the present invention.

FIG. 8 is a flowchart showing steps that are performable by first-stage comparators to implement a first stage of a voting method according to yet another embodiment of the present invention. Generally, the process may be implemented in parallel by N first-stage voters, where N is an integer, each of which sends one or more first-stage voted signals to a second-stage voter. The second-stage voter may vote among the first-stage voted signals in any desired manner. For convenience, the process will be described with reference to a single first-stage comparator (e.g., "Voter A"), which sends voted signals to a single second-stage comparator (e.g., "Voter C").

The process begins at step 500 when the first stage voter(s) receive their first instances of a particular signal from their associated receiver groups. Thus, for example, Voter A receives its first signal "A1" from its associated receiver group "A". The first stage voter(s) ("Voter A") create context groups at step 510, identifying characteristics of the signals that are to be received and voted, substantially as described in relation to FIGS. 2, 4 and 6. At step 515, the first stage voter(s) determine respective vote conclusion times that represent the time at which they will cease voting among signals of a particular context group (see step 530). In one embodiment, the vote conclusion time is determined by the first-stage voter(s) based on link delay information of signals eligible to be received from their particular receiver groups. Thus, for example, Voter A determines a vote conclusion time based on link delay information associated with its receiver group "A" (e.g., signals A1–A16). At step 520, the first stage voter(s) determine a maximum number of instances of the signal that are to be sent to the second stage comparator for signals of a particular context group. At step 523, the first stage voters obtain error status information associated with their first received signals (e.g., signal "A1") from which a first error threshold is derived for comparison to one or more subsequent signals, as will be described in greater detail in relation to steps 555 and 560. Then, at step 525. the first stage voter(s) send their first received signals to the second stage voter.

At step 530, the first-stage voter(s) determine whether the vote conclusion time has been reached, or in other words whether the voting time has expired for signals of a particular context group. If the voting time has expired, the process ends (step 590) and no more signals of that context group are sent to the second stage voter. Otherwise, if the voting time has not expired, the process continues at step 540 with the first stage voter(s) receiving next consecutive signals from their associated receiver groups. Thus, for example, after having received signal "A1," Voter A will receive signal "A2" at step 540 if the voting time has not expired.

For each consecutive signal received at step 540, the first-stage voters determine the context of those signals at step 545 and, if the signals are of the proper context (step 550), the first-stage voters proceed to step 555 where they identify the error status of the respective signals and compare the error status to an error threshold. In one embodiment, the error threshold represents the "best" error status yet received among signals of that particular context group. The threshold error status is stored in memory and updated, as appropriate when even better signals are encountered within the particular context group. In one embodiment, the error threshold is initially defined at step 523 based on the error status of signal "A1" and is periodically redefined at step 580 if any subsequent signal "A2," "A3" and so forth has an error status better than the previous threshold.

If at step 545 a received signal does not properly match the context group of a previous signal, the voter returns to step 510 to create a new context group and the process continues for signals of the new context group.

Signals having an error status "worse" than the error threshold (step 560) are discarded (step 565) and thereby ineligible to be sent to the second-stage voter. Signals having an error status "better" than the error threshold are eligible to be sent to the second-stage voter provided such delivery would not cause the second-stage voter to have received more than the maximum number of allowable instances of the signal defined at step 520. Accordingly, at step 570, before sending the signal to the second stage voter, the first stage voter(s) determine a cumulative number of instances of the signal that would result from sending the signal to the second stage voter. If sending the prospective signal would result in exceeding the maximum number of allowable instances of the signal (step 575), the signal is discarded (step 565). Otherwise, if sending the prospective signal would not exceed the maximum number of allowable instances of the signal, a new error threshold is defined at step 580 based on the error status of the signal and then the signal is sent to the second-stage voter (step 525). The signal(s) sent to the second-stage comparator may be voted in any desired manner.

Thus, for example, having already sent signal "A1," "A2" and "A4" to the second stage voter, suppose Voter A encounters signal "A5" that has an error status better than signal "A4." Voter A determines a cumulative number of instances of the signal associated with signals "A1," "A2," "A4" and "A5" and if that number does not exceed the maximum allowable number defined at step 520, signal "A5" is sent to the second-stage comparator (step 525) and the error status of signal "A5" becomes the new error threshold. If, however, the cumulative number of instances of the signal associated with signals "A1," "A2," "A4" and "A5" exceeds the maximum number of allowable instances of the signal defined at step 520, signal "A5" would be discarded at step 565 without defining a new error threshold.

In the process of FIG. 8, the first stage comparator(s) thereby perform a "filtering" process in which a plurality of instances of a signal are received and only those signals having a positive acceptability criteria are sent to the second stage voter. A determination of acceptability may be made based, for example, on context group information, timing information, frame information and/or error status information. Generally, the process is effected by retrieving characteristic information from the instances of the signal corresponding to how the acceptability or non-acceptability of the signal is to be determined. Thus, for example, characteristic information identifying the context group of a signal is retrieved if the acceptability criteria is being based on context group information; characteristic information identifying both the context group and error status of the signal is retrieved if the acceptability criteria is based on both context group information and error status information, and so forth.

Then, a determination of whether the instances of the signals are acceptable or not acceptable is made by comparing the retrieved characteristic information to selected target characteristic(s). In one embodiment, for example, where acceptability criteria is based at least in part upon context group information, a target characteristic is defined as a target context group (e.g., the context group of signal "A1"). A positive acceptability criteria is established if the context group information associated with the instance(s) of the signal under evaluation matches the target context group. Thus, for example, a positive acceptability criteria may be established for signal "A2" if the context group of signal "A2" matches that of signal "A1."

As another example, in one embodiment where acceptability criteria is based at least in part upon error status information, a target characteristic is defined by one or more successive error thresholds. The error statuses of successive signals under evaluation are compared, respectively, to most recent ones of the successive error thresholds and a positive acceptability criteria is established for any signal having an error status lower than the error threshold against which it is measured. In one embodiment, for example, the error threshold is initially defined based on the error status of signal "A1" and is periodically redefined if any subsequent signal "A2," "A3" and so forth has an error status better than the previous threshold. In this embodiment, therefore, a positive acceptability criteria may be established for signal "A2" if its error status is lower than that of signal "A1," in which case the error threshold is redefined corresponding to that of signal "A2." A positive acceptability criteria may then be established for signal "A3" if its error status is lower than signal "A2," and so forth.

It will be appreciated that voting methods having greater than two stages, for example three or greater stages may be employed without departing from the spirit and scope of the present invention. Moreover, while the present invention has been described with reference to the vote conclusion times being determined in a particular manner by the first-stage voters, it will be appreciated that the vote conclusion times may be determined by a variety of alternative methods and/or by alternative structures without departing from the spirit and scope of the invention. For example, the first-stage vote conclusion times might be determined by the second stage voter and then communicated to the second stage voter. Still another alternative might be for the vote conclusion times to be pre-programmed and retrieved from memory by the respective first- and/or second-stage voters rather than computed based on link delay or other signal information.

The present invention thereby provides a great deal of flexibility in both the structure and methods of operation of the comparator. The invention provides a voting algorithm useful for a large coverage area, and further provides for producing a voted signal without significant voting delays and without exceeding processing and/or hardware limitations of any particular components of the comparator.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A comparator comprising:
   one or more first stage voters operable to receive and vote among a plurality of instances of a signal, yielding respective first stage voted signals; and
   a second stage voter operably connected to the first stage voters, the second stage voter being operable to receive and vote among the first stage voted signals, yielding a second stage voted signal.

2. The comparator of claim 1 further comprising:
   a first stage vote conclusion timer for determining a first stage vote conclusion time; and
   a transmitter arranged and constructed to send the first stage voted signals to the second stage voter substantially at the first stage vote conclusion time.

3. The comparator of claim 1 being operable to receive M instances of a signal, where M is an integer exceeding the number of instances of the signal received at any one of the first stage voters.

4. The comparator of claim 1 including a plurality of first stage voters.

5. A voting method comprising the steps of:
   receiving M instances of a signal at a comparator comprising N first stage voters and a second stage voter, where M and N are integers;
   voting, by respective ones of the first stage voters, among a plurality of the M instances of the signal, yielding one or more first stage voted signals;
   sending the first stage voted signals to the second stage voter; and
   voting, by the second stage voter, among the first stage voted signals, yielding a second stage voted signal.

6. The method of claim 5 including the step of determining, by the second stage voter, a vote conclusion time.

7. The method of claim 6 wherein the step of voting, by the second stage voter, is accomplished substantially at the vote conclusion time.

8. A voting method comprising the steps of:
   receiving M instances of a signal at a comparator comprising N first stage voters and a second stage voter, where M and N are integers;
   determining a first stage vote conclusion time;
   voting, by respective ones of the first stage voters, among a plurality of the M instances of the signal, yielding one or more first stage voted signals;
   substantially at the first stage vote conclusion time, sending the first stage voted signals to the second stage voter; and
   voting, by the second stage voter, among the first stage voted signals, yielding a second stage voted signal.

9. The method of claim 8 wherein the step of determining the first stage vote conclusion time comprises identifying, by a designated one of the first stage voters, time delay information for each of the M instances of the signal at the N first stage voters.

10. The method of claim 9 including the step of communicating, by the designated one of the first stage voters, the first stage vote conclusion time to the other first stage voters.

11. The method of claim 8 including the step of determining, by the second stage voter, a second stage vote conclusion time, the second stage voted signal being produced substantially at the second stage vote conclusion time.

12. The method of claim 8 including the step of determining, by the first stage voters, respective context groups associated with the M instances of the signal, the voting step comprising voting, by respective ones of the first stage voters, among instances of the signal which are members of a particular context group.

13. A voting method comprising the steps of:
   receiving M instances of a signal at a comparator comprising N first stage voters and a second stage voter, where M and N are integers;
   determining, by the first stage voters, respective first stage vote conclusion times;
   voting, by respective ones of the first stage voters, among a plurality of the M instances of the signal, yielding one or more first stage voted signals;
   substantially at the respective first stage vote conclusion times, sending the first stage voted signals to the second stage voter; and
   voting, by the second stage voter, among the first stage voted signals, yielding a second stage voted signal.

14. The method of claim 13 wherein the step of determining the respective first stage vote conclusion times comprises identifying, by each of the first stage voters, time delay information for each of the M instances of the signal at the N first stage voters.

15. The method of claim 14 wherein the respective first stage vote conclusion times are substantially coincident in time.

16. The method of claim 13 including the step of determining, by the second stage voter, a second stage vote conclusion time, the second stage voted signal being produced substantially at the second stage vote conclusion time.

17. The method of claim 13 including the step of determining, by the first stage voters, respective context groups associated with the M instances of the signal, the voting step comprising voting, by respective ones of the first stage voters, among instances of the signal that are members of a particular context group.

18. A voting method comprising a first stage voter performing the steps of:
   receiving a plurality of instances of a signal;
   retrieving characteristic information from each of the instances of the signal;
   defining one or more target characteristics corresponding to the retrieved characteristic information;

evaluating, one at a time, respective ones of the plurality of instances of the signal based on a comparison of the retrieved characteristic information with the corresponding target characteristics, yielding respective acceptability criteria.

19. The method of claim 18 wherein the retrieved characteristic information comprises context group information and the target characteristics include a target context group, a positive acceptability criteria being established for those instances of the signal having context group information matching the target context group.

20. The method of claim 18 further comprising the step of determining a vote conclusion time for receiving instances of the signal, the evaluating step comprising evaluating only those instances of the signal received before the vote conclusion time.

21. The method of claim 18 further comprising the step of sending, to a second stage voter, selected instances of the signal having a positive acceptability criteria.

22. The method of claim 21 further comprising the step of determining a maximum allowable number of instances of the signal eligible to be sent to the second stage voter, the sending step being inhibited if it would result in sending more than the maximum number of instances of the signal to the second stage voter.

23. The method of claim 18 wherein the retrieved characteristic information comprises error status information and the target characteristics include one or more successive error thresholds, a positive acceptability criteria being established for instances of the signal having respective error statuses lower than most recent ones of the error thresholds.

* * * * *